(12) United States Patent
Zhang et al.

(10) Patent No.: US 12,506,586 B2
(45) Date of Patent: Dec. 23, 2025

(54) HALF-DUPLEX AND FULL DUPLEX BANDWIDTH ADAPTATION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 503 days.

(21) Appl. No.: 17/971,499

(22) Filed: Oct. 21, 2022

(65) Prior Publication Data

US 2024/0137192 A1 Apr. 25, 2024
US 2024/0235799 A9 Jul. 11, 2024

(51) Int. Cl.
*H04L 5/14* (2006.01)

(52) U.S. Cl.
CPC ..................... *H04L 5/14* (2013.01)

(58) Field of Classification Search
None
See application file for complete search history.

(56) References Cited

U.S. PATENT DOCUMENTS

| 2021/0314946 | A1* | 10/2021 | Ang | H04L 5/001 |
| 2021/0336759 | A1* | 10/2021 | Abdelghaffar | H04L 5/0044 |
| 2023/0254105 | A1* | 8/2023 | Wong | H04L 5/0053 370/281 |
| 2023/0413374 | A1* | 12/2023 | Tsai | H04L 5/003 |

OTHER PUBLICATIONS

International Search Report and Written Opinion—PCT/US2023/032552—ISA/EPO—Jan. 9, 2024.
Samsung: "Subband Non-Overlapping Full Duplex for NR Duplex Evolution", 3GPP TSG-RAN WG1 Meeting #109-e, R1-2203904, 3rd Generation Partnership Project (3GPP), e-Meeting, May 9-20, 2022, 1-15 pages.

\* cited by examiner

*Primary Examiner* — Srinivasa R Reddivalam
(74) *Attorney, Agent, or Firm* — Seyfarth Shaw LLP

(57) ABSTRACT

A method of wireless communication by a user equipment (UE) includes receiving a configuration for switching between a full frequency bandwidth slot in a half duplex mode, and a partial frequency bandwidth slot in a subband based base station full duplex (SBFD) mode. The full frequency bandwidth slot is for uplink communications or downlink communications. The partial frequency bandwidth slot is for the uplink communications corresponding to an uplink subband or for downlink communications corresponding to at least one downlink subband. The method also includes switching, in accordance with the configuration, between the full frequency bandwidth slot and the partial frequency bandwidth slot.

30 Claims, 12 Drawing Sheets

1100 ⟶

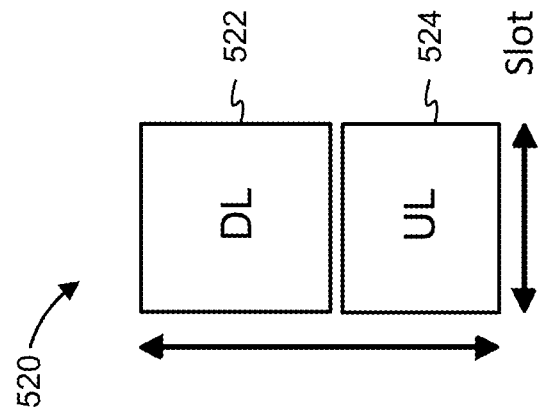
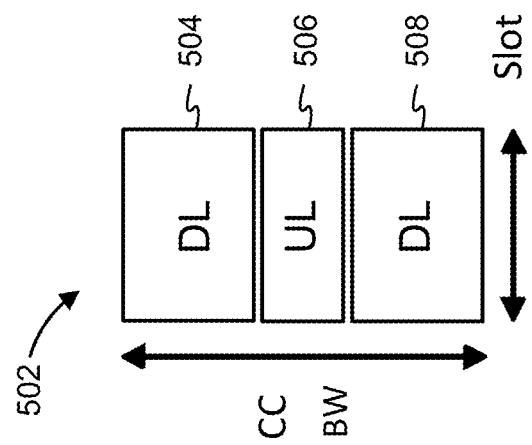
FIG. 5

1100 ⟶

```
┌─────────────────────────────────────────────────┐
│ RECEIVE A CONFIGURATION FOR SWITCHING BETWEEN   │─── 1102
│ A FULL FREQUENCY BANDWIDTH SLOT FOR UPLINK      │
│ COMMUNICATIONS OR DOWNLINK COMMUNICATIONS IN    │
│ A HALF DUPLEX MODE, AND A PARTIAL FREQUENCY     │
│ BANDWIDTH SLOT FOR THE UPLINK COMMUNICATIONS    │
│ CORRESPONDING TO AN UPLINK SUBBAND OR FOR       │
│ DOWNLINK COMMUNICATIONS CORRESPONDING TO AT     │
│ LEAST ONE DOWNLINK SUBBAND IN A SUBBAND BASED   │
│ BASE STATION FULL DUPLEX MODE                   │
└─────────────────────────────────────────────────┘
                         │
┌─────────────────────────────────────────────────┐
│ SWITCH, IN ACCORDANCE WITH THE CONFIGURATION,   │
│ BETWEEN THE FULL FREQUENCY BANDWIDTH SLOT       │─── 1104
│ AND THE PARTIAL FREQUENCY BANDWIDTH SLOT        │
└─────────────────────────────────────────────────┘
```

*FIG. 11*

HALF-DUPLEX AND FULL DUPLEX BANDWIDTH ADAPTATION

FIELD OF THE DISCLOSURE

The present disclosure relates generally to wireless communications, and more specifically to switching between a half-duplex (HD) bandwidth slot and a full duplex (FD) bandwidth slot during communications.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method of wireless communication by a user equipment (UE) includes receiving a configuration for switching between a full frequency bandwidth slot for uplink communications or downlink communications in a half duplex mode, and a partial frequency bandwidth slot for the uplink communications corresponding to an uplink subband or for downlink communications corresponding to at least one downlink subband in a subband based base station full duplex mode. The method also includes switching, in accordance with the configuration, between the full frequency bandwidth slot and the partial frequency bandwidth slot.

In other aspects of the present disclosure, a method of wireless communication by a network device includes transmitting a configuration for switching between a full frequency bandwidth slot for uplink communications or downlink communications in a half duplex mode, and a partial frequency bandwidth slot for the uplink communications corresponding to an uplink subband and for downlink communications corresponding to at least one downlink subband in a subband based base station full duplex mode. The method also includes switching, in accordance with the configuration, between the full frequency bandwidth slot and the partial frequency bandwidth slot.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 5 is a block diagram illustrating subband full duplex (SBFD) configurations, in accordance with aspects of the present disclosure.

FIG. 11 is a flow diagram illustrating an example process performed, for example, by a user equipment (UE), in accordance with various aspects of the present disclosure.

DETAILED DESCRIPTION

Figure 1:
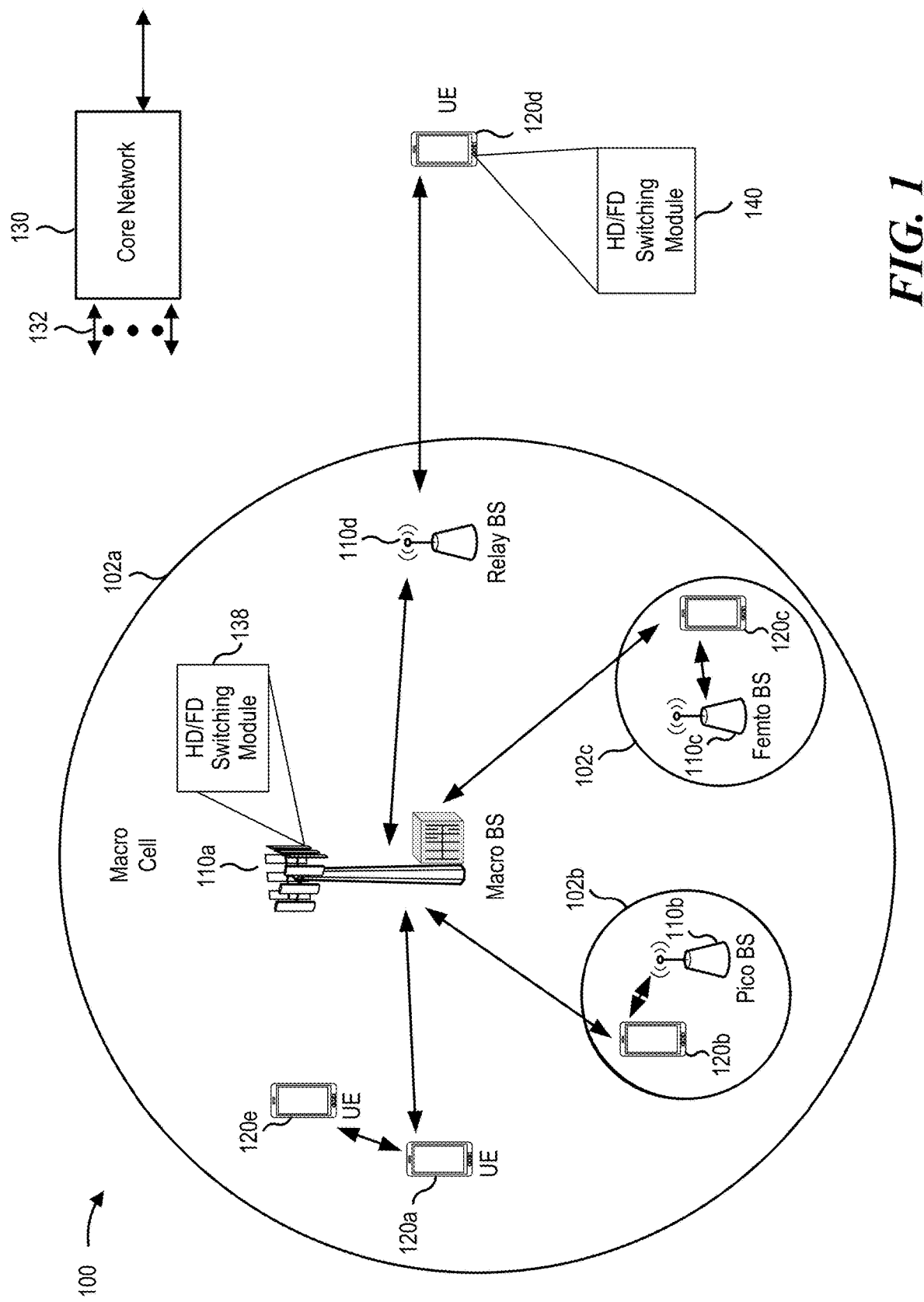
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Particular aspects of the subject matter described in this disclosure can be implemented to realize one or more of the following potential advantages. In some examples, the described techniques, such as receiving . . . may increase spectrum utilization.

New radio (NR) may include scenarios with full duplex communications such that a single device may simultaneously transmit and receive. These scenarios may operate with a time division duplexed (TDD) unpaired spectrum, for example. In some implementations, the network (e.g., gNB) may operate in full duplex mode while half-duplex operation occurs at the user equipment (UE) side. Subband full duplex (SBFD) mode enables a network device (e.g., a base station) to simultaneously transmit and receive downlink and uplink communications on a subband basis in a same slot. In the presence of strong self-interference, a base station may prefer to switch from full duplex (for example, SBFD) operation to half duplex operation. Such a switch may involve a downlink/uplink bandwidth change for the UE.

Aspects of the present disclosure introduce a group common-physical downlink control channel (GC-PDCCH) for half duplex and full duplex bandwidth adaptation. According to some aspects, a group common downlink control information (DCI) message may be introduced for downlink/uplink bandwidth switching of a group of SBFD aware UEs. The DCI may carry individual downlink/uplink bandwidth fields per UE, or common downlink/uplink bandwidth fields for all UEs. If self-interference at the base station occurs occasionally but unpredictably, the base station may enable half duplex mode for signaling of critical control messages. In some aspects of the present disclosure, switching between half duplex and full duplex bandwidth occurs at a pre-determined time. For example, a pre-determined half duplex/full duplex bandwidth switching pattern may be configured to periodically switch between downlink/uplink bandwidths for half duplex and SBFD modes of a base station. The patterns may be configured per UE or for a group of UEs. The bandwidth (or subband) switch based on the pre-determined pattern may be explicitly or implicitly indicated.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "Node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a half duplex/full duplex (HD/FD) module 140. For brevity, only one UE 120d is shown as including the HD/FD module 140. The HD/FD module 140 may receive a configuration for switching between a full frequency bandwidth slot in a half duplex mode, and a partial frequency bandwidth slot in a subband based base station full duplex mode. The HD/FD module 140 may also switch, in accordance with the configuration, between the full frequency bandwidth slot and the partial frequency bandwidth slot.

Figure 3:
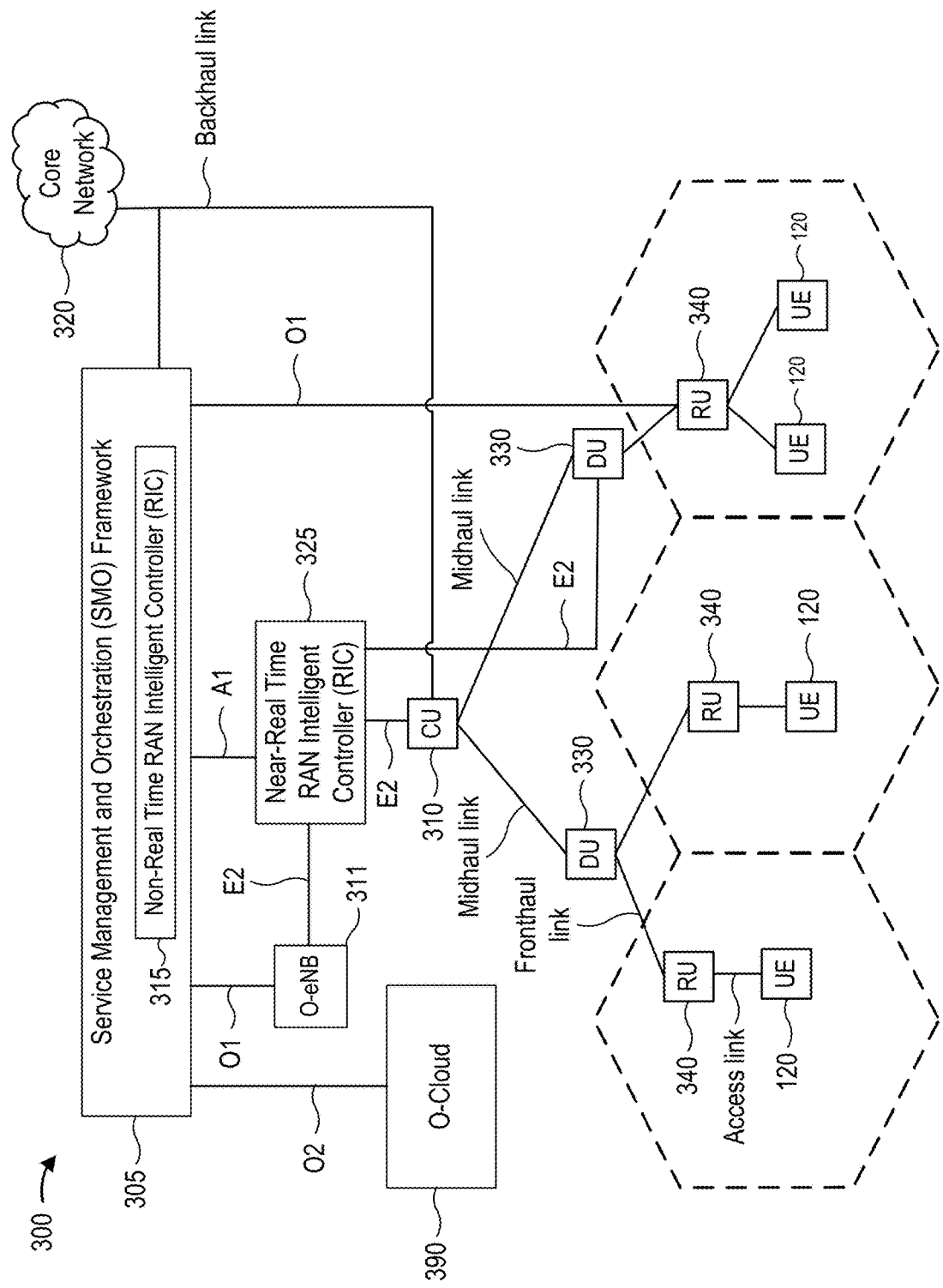
FIG. 3 is a block diagram illustrating an example disaggregated base station architecture, in accordance with various aspects of the present disclosure.

The core network 130 or the base stations 110 or any other network device (e.g., as seen in FIG. 3) may include an HD/FD module 138. For brevity, only one base station 110a is shown as including the HD/FD module 138. The HD/FD module 138 may transmit a configuration for switching between a full frequency bandwidth slot in a half duplex mode, and a partial frequency bandwidth slot in a subband based base station full duplex mode. The HD/FD module 138 may also switch, in accordance with the configuration, between the full frequency bandwidth slot and the partial frequency bandwidth slot.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
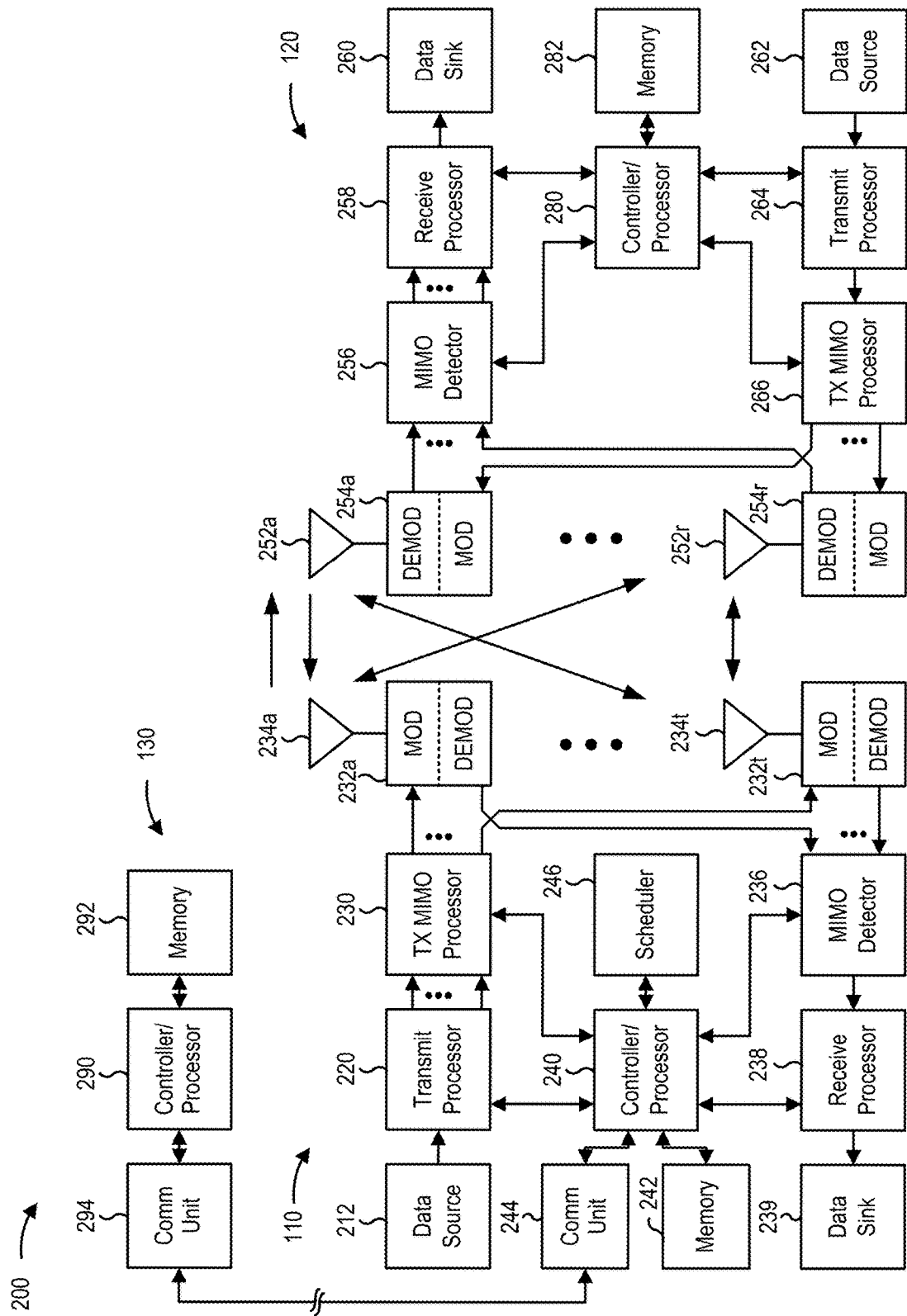
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with half duplex/full duplex switching as described in more detail elsewhere. For example, the controller/processor 240 of the base station 110, the controller/processor 280 of the UE 120, and/or any other component(s) of FIG. 2 may perform or direct operations of, for example, the processes of FIGS. 11 and 12 and/or other processes as described. Memories 242 and 282 may store data and program codes for the base station 110 and UE 120, respectively. A scheduler 246 may schedule UEs for data transmission on the downlink and/or uplink.

In some aspects, the UE 120 and/or base station 110 may include means for receiving, means for switching, and means for transmitting. Such means may include one or more components of the UE 120 or base station 110 described in connection with FIG. 2.

As indicated above, FIG. 2 is provided merely as an example. Other examples may differ from what is described with regard to FIG. 2.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., central unit—user plane (CU-UP)), control plane functionality (e.g., central unit—control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO framework 305 may be configured to support RAN deployment and provisioning of non-virtualized and virtualized network elements. For non-virtualized network elements, the SMO framework 305 may be configured to support the deployment of dedicated physical resources for RAN coverage requirements, which may be managed via an operations and maintenance interface (such as an O1 interface). For virtualized network elements, the SMO framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO framework 305 can communicate with a hardware aspect of a 4G RAN, such as an open eNB (O-eNB) 311, via an O1 interface. Additionally, in some implementations, the SMO framework 305 can communicate directly with one or more RUs 340 via an O1 interface. The SMO framework 305 also may include a non-RT RIC 315 configured to support functionality of the SMO framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO framework 305 (such as reconfiguration via O1) or via creation of RAN management policies (such as A1 policies).

NR may include scenarios with full duplex communications such that a single device may simultaneously transmit and receive. These scenarios may operate with a time division duplexed (TDD) unpaired spectrum, for example. In some implementations, the network (e.g., gNB) may operate in full duplex mode while half duplex operation occurs at the user equipment (UE) side.

A subband non-overlapping full duplex mode may operate in a dynamic/flexible TDD environment. In some instances, crosslink interference (CLI) may occur. For example, both intra-subband crosslink interference and inter-subband crosslink interference may occur during subband non-overlapping full duplex operation.

Figure 4B:
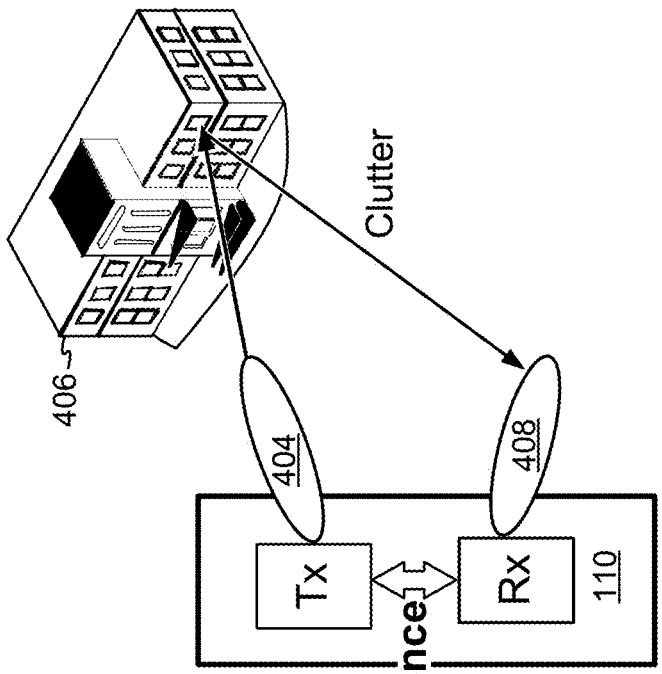
FIGS. 4A, 4B, and 4C are block diagrams illustrating full duplex communication, in accordance with aspects of the present disclosure.
Figure 4C:
Figure 4A:
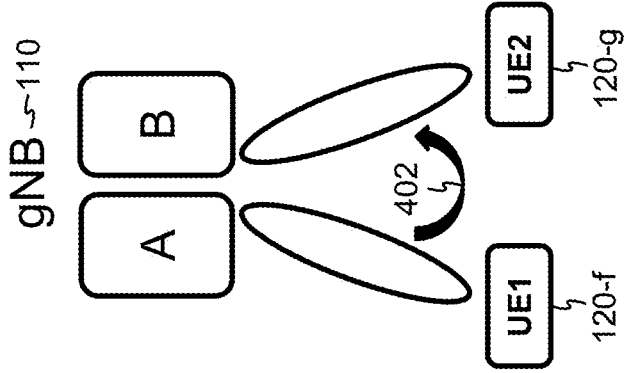

FIGS. 4A, 4B, and 4C are block diagrams illustrating examples of full duplex communication, in accordance with aspects of the present disclosure. In FIG. 4A, a network device (e.g., gNB) 110 transmits to a first UE 120-f from a first panel (A). The network device 110 receives a signal from a second UE 120-g with a second panel (B). Crosslink interference 402 may result from the full duplex operation, such that the transmissions to the first UE 120-f interfere with the signals received from the second UE 120-g. In the example of FIG. 4B, a signal 404 transmitted from the network device 110 reflects off a structure 406 and interferes with a signal 408 received from a device (not shown). This type of interference may be referred to as clutter. Self-interference (e.g., crosslink interference) may also occur in the scenario depicted in FIG. 4B. As seen in FIG. 4C, downlink/uplink (DL/UL) multi-user multiple input multiple output (MU-MIMO) communications may occur while in full duplex mode. That is, a downlink signal 410 to a first user (not shown) may interfere with a signal 412 received from a second user (not shown). Clutter may also disrupt the communications.

Subband full duplex (SBFD) mode enables simultaneous transmitting and receiving of downlink and uplink communications on a subband basis in a same slot. SBFD communications increase the uplink duty cycle leading to latency reduction. For example, it becomes possible to receive downlink signals in uplink only slots, which enables latency savings. The increased uplink duty cycle also improves uplink coverage and enhances system capacity, resource utilization, and spectrum efficiency. SBFD operation enables flexible and dynamic uplink/downlink resource adaption according to uplink/downlink traffic in a robust manner.

FIG. 5 is a block diagram illustrating subband full duplex (SBFD) configurations, in accordance with aspects of the present disclosure. In a first configuration 502, a component carrier (CC) bandwidth (BW) of a slot includes an uplink subband 506 between two downlink subbands 504, 508. In a second configuration 520, a component carrier (CC) bandwidth (BW) of a slot includes a downlink subband 522 and an uplink subband 524.

In the presence of strong self-interference, a base station may prefer to switch from full duplex (for example, SBFD) operation to half duplex operation. Such a switch may involve a downlink/uplink bandwidth change for the UE. With half duplex operation by the base station, the UE downlink/uplink bandwidth can be the full operation bandwidth to fully utilize the spectrum. When the base station operates in SBFD mode, the downlink/uplink bandwidth may be narrower than the full bandwidth to save UE power.

Figure 6:
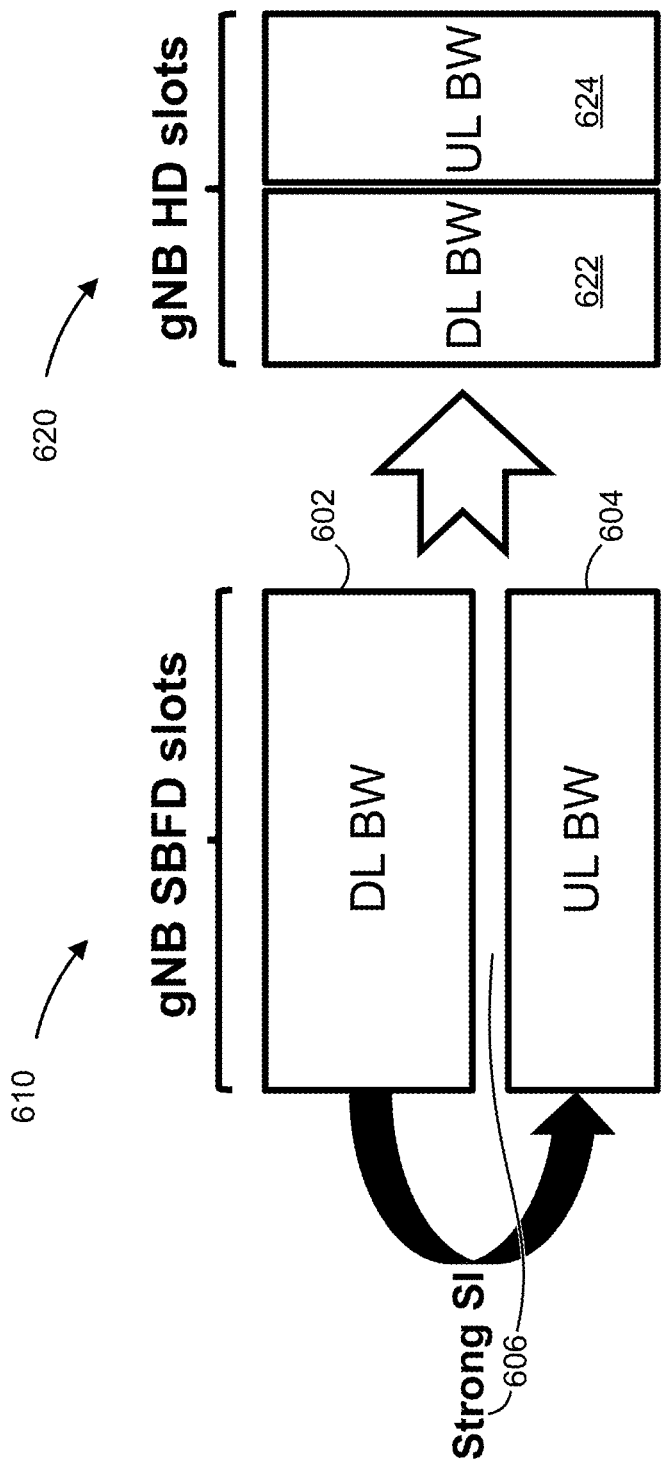
FIG. 6 is a block diagram illustrating full duplex and half-duplex operations, in accordance with aspects of the present disclosure.

FIG. 6 is a block diagram illustrating full duplex and half duplex operations, in accordance with aspects of the present disclosure. In full duplex operation 610, each one of a downlink bandwidth 602 and an uplink bandwidth 604 are less than the full bandwidth, in part due to a gap 606 between the uplink and downlink subbands 602, 604. The base station may prefer half duplex operation 620 when experiencing strong self-interference (SI) 606. According to aspects of the present disclosure, the base station may switch to half duplex operation 620. After switching to half duplex operation 620, each of a downlink and an uplink bandwidth 622, 624 cover the full spectrum, and self-interference 606 is decreased.

Other than power savings resulting from transmitting at less than the full bandwidth, additional benefits may be lost if the UE is unaware of the actual configured downlink/uplink bandwidth for the base station's SBFD operation. For example, the bandwidth of downlink/uplink reference signals may be unnecessarily wide if the UE is unaware of the actual downlink/uplink bandwidth being used. For periodic or semi-periodic channel state information reference signal (CSI-RS) measurement, the UE may measure the full bandwidth instead of the bandwidth over which the CSI-RS is actually transmitted. The full bandwidth may be affected by inter-UE CLI from the actual uplink bandwidth, especially from neighbor cell UEs in the absence of inter-cell coordination. This type of measurement may lead to inaccurate layer one (L1) measurement, as well as incorrectly triggered beam failure recovery (BFR), radio link failure (RLF), handover (HO), etc.

Figure 7:
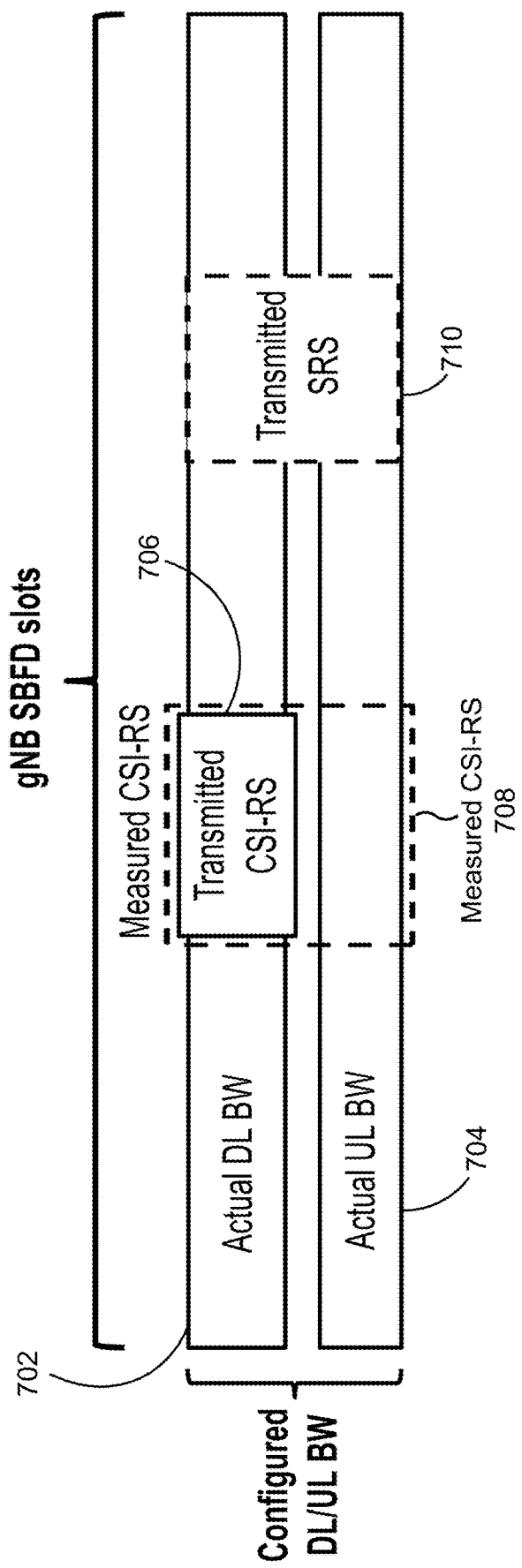
FIG. 7 is a block diagram illustrating reference signal issues resulting from a UE that is unaware of a configured downlink/uplink bandwidth, in accordance with aspects of the present disclosure.

FIG. 7 is a block diagram illustrating reference signal issues resulting from a UE that is unaware of a configured downlink/uplink bandwidth, in accordance with aspects of the present disclosure. In the example of FIG. 7, a base station operates in full duplex mode with a downlink bandwidth 702 and an uplink bandwidth 704 of a configured uplink/downlink bandwidth. The base station transmits a CSI RS 706 on the downlink bandwidth 702. If a UE is unaware of the downlink/uplink bandwidth configuration, the UE measures the CSI-RS across both the downlink bandwidth 702 and the uplink bandwidth 704. The measurement 708 may be affected by inter-UE CLI from the actual uplink bandwidth 704, especially from neighbor cell UEs.

For periodic or semi-periodic sounding reference signals (SRSs), the UE may transmit an SRS 710 in the full bandwidth if the UE is unaware of the configured downlink/uplink bandwidth for full duplex operation. As a result, the UE may cause inter-UE CLI to the actual downlink bandwidth 702 with the SRS 710 transmitted across the full bandwidth. The interference is especially likely for neighbor cell UEs in the absence of inter-cell coordination.

Limiting downlink and uplink reference signals to half duplex slots may address the described issues. However, such scheduling may reduce flexibility of the reference signal location and periodicity. Moreover, additional CLI suppression provided by separate UE downlink and uplink radio frequency (RF) bandwidths may not always be achieved. Interference variation may be seen by the UE RF front end and such variation may cause challenges for automatic gain control (AGC), low noise amplifier (LNA), and/or mixer operation.

Aspects of the present disclosure introduce a group common-physical downlink control channel (GC-PDCCH) for half duplex and full duplex bandwidth adaptation. According to some aspects, a group common DCI message may be introduced for downlink/uplink bandwidth switching of a group of SBFD aware UEs. The DCI may carry individual downlink/uplink bandwidth fields per UE, or common downlink/uplink bandwidth fields for all UEs. The downlink/uplink bandwidth may be equal to a downlink/uplink subband for SBFD slots. In some aspects, the downlink bandwidth is non-contiguous with two non-contiguous downlink subbands. If self-interference at the base station occurs occasionally but unpredictably, the base station may enable half duplex mode for signaling critical control messages. For example, half duplex operation may be enabled for transmission of signals, such as a synchronization signal block (SSB), system information block (SIB), paging messages, and initial access messages. The initial access message may include physical random access channel (PRACH) messages.

Figure 8A:
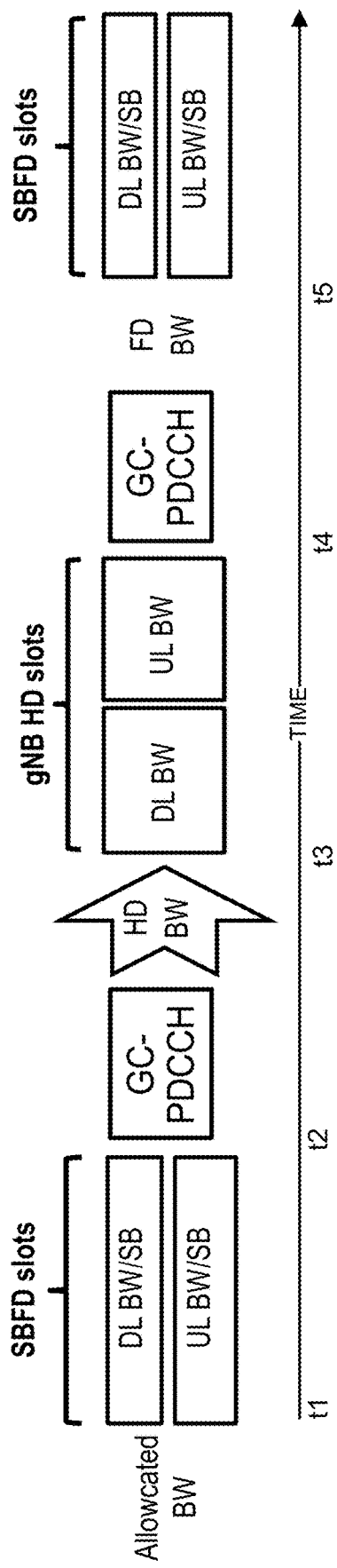
FIGS. 8A and 8B are block diagrams illustrating half-duplex and full duplex bandwidth adaptation, in accordance with aspects of the present disclosure.
Figure 8B:
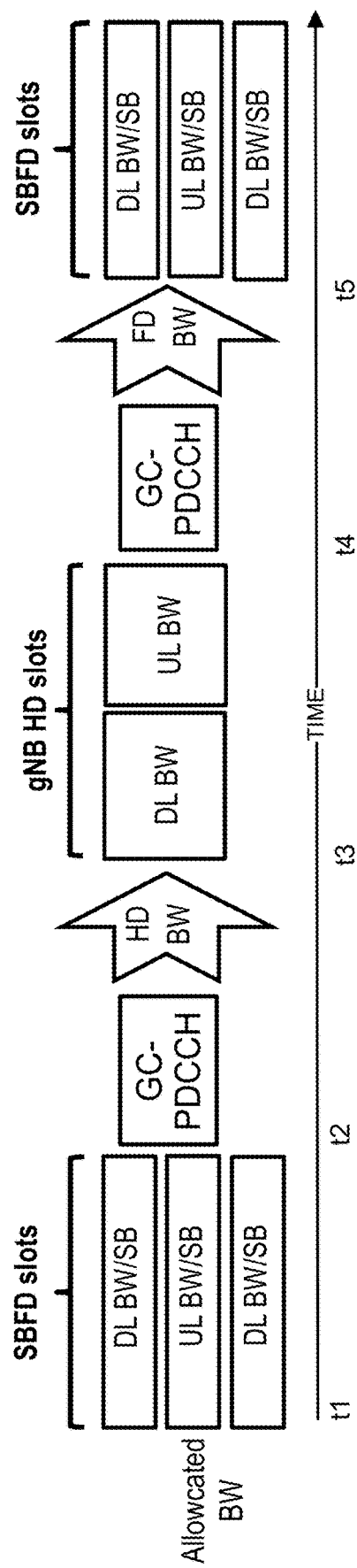

FIGS. 8A and 8B are block diagrams illustrating half duplex and full duplex bandwidth adaptation, according to aspects of the present disclosure. In the example of FIG. 8A, use of an allocated bandwidth for a UE switches between a full duplex and half duplex configuration, and back to the full duplex configuration. At time t1, the time slots are configured for full duplex operation, for example, in an SBFD mode. In the example of FIG. 8A, a single downlink bandwidth (e.g., a subband) and a single uplink bandwidth (e.g., a subband) are configured for each slot to enable full duplex communications. At time t2, the base station transmits a GC-PDCCH message initiating a change to a half duplex bandwidth. The GC-PDCCH message may be a group common DCI message addressed to a single UE or addressed to a group of UEs.

At time t3, the base station and UE(s) switch to a half duplex bandwidth configuration such that a downlink bandwidth occupies an entire allocated bandwidth for a first slot and then an uplink bandwidth occupies the entire allocated bandwidth for a subsequent slot. The half duplex operation may be suitable for critical control message transmissions.

At time t4, the base station transmits a GC-PDCCH message initiating a change to a full duplex bandwidth. At time t5, the base station and UE(s) switch to a full duplex bandwidth configuration. In the example of FIG. 8A, a single downlink bandwidth (e.g., a subband) and a single uplink bandwidth (e.g., a subband) are configured for each slot to enable full duplex communications.

In the example of FIG. 8B, an allocated bandwidth for a UE may also switch between a full duplex and half duplex configuration. In FIG. 8B, however, the full duplex configuration includes two non-contiguous downlink subbands. At time t1, the time slots are configured for full duplex operation, for example, in an SBFD mode. In the example of FIG. 8B, two downlink bandwidths (e.g., subbands) are separated by a single uplink bandwidth (e.g., a subband) in each slot to enable full duplex communications. At time t2, the base station transmits a GC-PDCCH message initiating a change to a half duplex bandwidth. The GC-PDCCH message may be a group common DCI message addressed to a single UE or addressed to a group of UEs.

At time t3, the base station and UE(s) switch to a half duplex bandwidth configuration such that a downlink bandwidth occupies an entire allocated bandwidth for a first slot and then an uplink bandwidth occupies the entire allocated bandwidth for a subsequent slot. The half duplex operation may be suitable for critical control message transmissions.

At time t4, the base station transmits a GC-PDCCH message initiating a change to a full duplex bandwidth. At time t5, the base station and UE(s) switch to a full duplex bandwidth configuration. In the example of FIG. 8B, two downlink bandwidths (e.g., subbands) are separated by a single uplink bandwidth (e.g., a subband) in each slot to enable full duplex communications.

In some aspects of the present disclosure, switching between half duplex and full duplex bandwidth occurs at a pre-determined time. For example, a pre-determined half duplex/full duplex bandwidth switching pattern may be configured to periodically switch between downlink/uplink bandwidths for half duplex and SBFD modes of a base station. The patterns may be configured per UE or for a group of UEs.

A half duplex period may contain occasions for critical control messages. Critical messages may include, for example, a synchronization signal block (SSB), system information block (SIB), paging messages, and initial access messages. The initial access messages may include physical random access channel (PRACH) messages.

The SBFD slots may be configured with a pattern indicating a single downlink bandwidth and a single uplink bandwidth. The downlink bandwidth and uplink bandwidth may be equal to downlink and uplink subbands for SBFD slots. In other implementations, the SBFD slots may be configured with a pattern including a single uplink bandwidth between a pair of non-contiguous downlink bandwidths (e.g., subbands). The pre-determined half duplex/full duplex bandwidth switching pattern may be configured per UE or for a group of UEs to periodically switch between downlink and uplink bandwidths for half duplex and SBFD modes of a base station.

Figure 9:
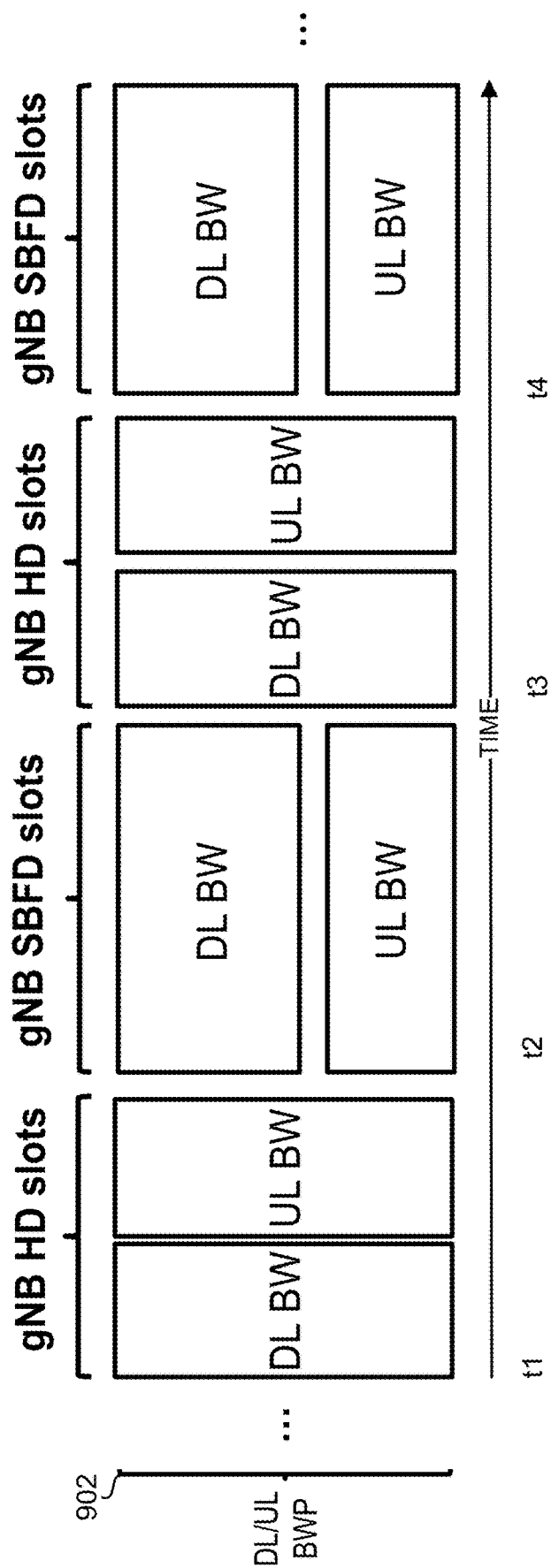
FIG. 9 is a block diagram illustrating predetermined half-duplex and full duplex bandwidth switching, in accordance with aspects of the present disclosure.

Assuming a same pair of downlink bandwidth part (BWP) and uplink BWP has been configured, the pre-configured pattern changes the downlink and uplink bandwidth (e.g., subband) but not the BWP. The same BWP pair is across legacy downlink/uplink symbols or slots and SBFD symbols or slots. FIG. 9 is a block diagram illustrating predetermined half duplex and full duplex bandwidth switching, according to aspects of the present disclosure. In the example of FIG. 9, a downlink and uplink BWP 902 has been configured. At time t1, the time slots are configured for a half duplex bandwidth such that a downlink bandwidth occupies an entire configured BWP 902 for a first slot and then an uplink bandwidth occupies the entire configured BWP 902 for a subsequent slot. At time t2, the pattern switches to full duplex operation, for example, an SBFD mode. A single downlink bandwidth (e.g., a subband) and a single uplink bandwidth (e.g., a subband) are configured for each slot to enable full duplex communications. At time t3, the base station and UE(s) switch to the half duplex operation. At time t4, the base station and UE(s) switch to the full duplex bandwidth configuration where a single downlink bandwidth (e.g., a subband) and a single uplink bandwidth (e.g., a subband) are configured for each slot.

The bandwidth (or subband) switch, based on the pre-determined pattern, may be explicitly or implicitly indicated. In some implementations, explicit signaling may include UE dedicated signaling or group common layer one, layer two, or layer three (L1/L2/L3) signaling. The explicit signaling may indicate each switch between duplex modes. Alternatively, the explicit signaling may be semi-static pattern based.

Implicit signaling may be triggered by a certain event, for example, a change of duplex/operation mode, which can be explicitly signaled or implicitly determined. An example of an implicit trigger is switching to an original or default mode when a timer expires after having switched to a fallback mode without instruction to further stay in the fallback mode. For an explicit indication, the event may be a semi-static duplex mode pattern, or a dynamic indication of a duplex mode switch. For an implicit indication, if a UE is in full duplex mode, a rule may be defined. For example, if a UE's self interference or cross link interference from neighbor UE is too large (e.g., greater than a threshold), the UE will implicitly fallback to legacy half duplex mode.

The half duplex and SBFD modes may have different pre-configured bandwidth patterns. In one example, the SBFD mode may have multiple parameter sets with different guard band sizes. The different guard band sizes change corresponding downlink bandwidth (e.g., subband) or uplink bandwidth (e.g., subband) sizes. In another example, an SBFD mode may have multiple parameter sets with different uplink subband sizes that will change corresponding downlink bandwidth (e.g., subband) and/or guard band sizes.

Figure 10:
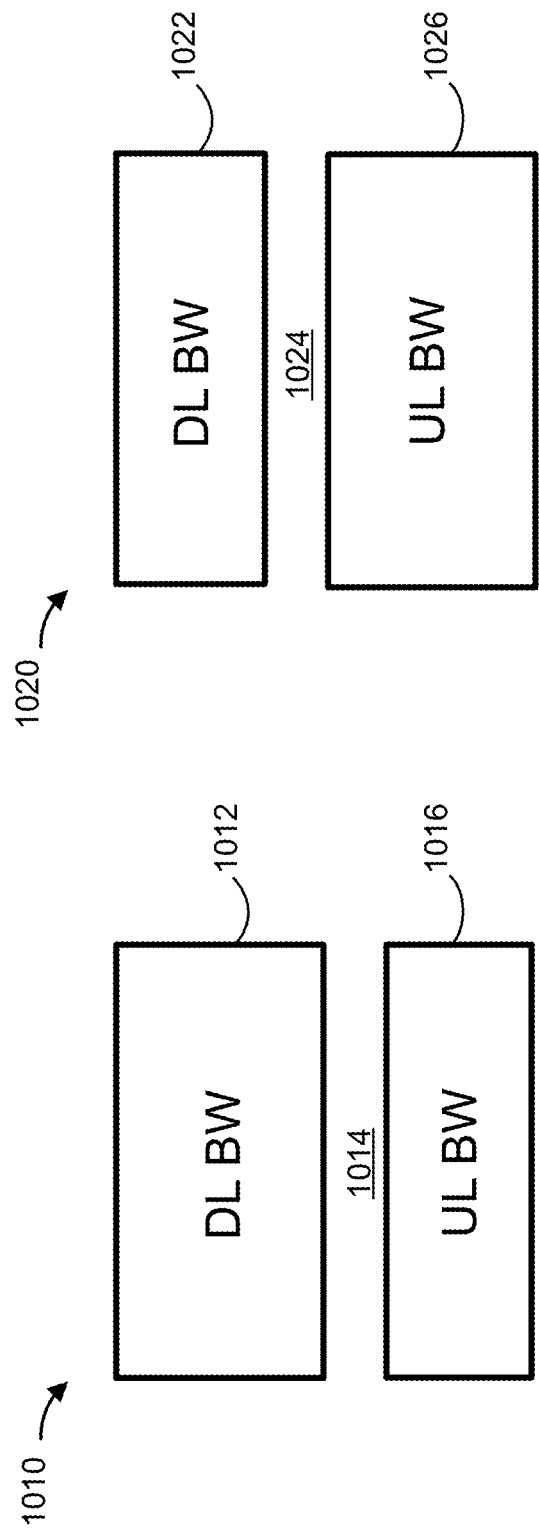
FIG. 10 is a block diagram illustrating different pre-configured bandwidth patterns, in accordance with aspects of the present disclosure.

FIG. 10 is a block diagram illustrating different pre-configured bandwidth patterns, in accordance with various aspects of the present disclosure. In a first pre-configured bandwidth pattern 1010, a downlink bandwidth 1012 has a first size, a guard band 1014 has a first size, and an uplink bandwidth 1016 has a first size. In a second pre-configured bandwidth pattern 1020, a downlink bandwidth 1022 has a second size, a guard band 1024 has a second size, and an uplink bandwidth 1026 has a second size. Because the second pattern 1020 has a different guard band size than the first pattern 1010, the uplink bandwidths 1016, 1026 and downlink bandwidths 1012, 1022 also have different sizes in the different pre-configured bandwidth patterns 1010, 1020.

As indicated above, FIGS. 4-10 are provided as examples. Other examples may differ from what is described with respect to FIGS. 4-10.

FIG. 11 is a flow diagram illustrating an example process 1100 performed, for example, by a user equipment (UE), in accordance with various aspects of the present disclosure. The example process 1100 is an example of switching between a half-duplex (HD) bandwidth slot and a full duplex (FD) bandwidth slot during communications. The operations of the process 1100 may be implemented by a UE 120.

At block 1102, the user equipment (UE) receives a configuration for switching between a full frequency bandwidth slot in a half duplex mode, and a partial frequency bandwidth slot in a subband based base station full duplex mode. The partial frequency bandwidth may be for the uplink communications corresponding to an uplink subband or for downlink communications corresponding to at least one downlink subband. The full frequency bandwidth slot may be for uplink or downlink communications. For example, the UE (e.g., using the antenna 252, DEMOD/MOD 254, MIMO detector 256, receive processor 258, controller/processor 280, memory 282, and/or the like) may receive the configuration. In some aspects, the configuration is a group common downlink control information (DCI) message, which may carry the configuration for a group of UEs. In other aspects, the configuration is a UE dedicated downlink control information (DCI) message that carries the configuration for an individual UE. The partial bandwidth slot for downlink communications may comprise non-contiguous frequency subbands or a single contiguous frequency subband. The full frequency bandwidth slot for the uplink communications or the downlink communications in the half duplex mode may correspond to signaling for at least one of: a synchronization signal block (SSB), a system information block (SIB), a paging message, or a physical random access channel (PRACH). The configuration may comprise a pre-determined bandwidth or subband switching pattern that does not change a bandwidth part (BWP) configured for the uplink communications and/or the downlink communications. In some aspects, the configuration comprises explicit signaling dedicated to the UE or to a group of UEs. The explicit signaling may be for semi-static switching between the full frequency bandwidth slot and the partial frequency bandwidth slot. In other aspects, the explicit signaling is radio resource control (RRC) signaling, a media access control-control element (MAC-CE) or downlink control information (DCI) signaling. In still other aspects, the explicit signaling is for per-switch dynamic switching between the full frequency bandwidth slot and the partial frequency bandwidth slot. The configuration may be implicit signaling triggered by an event. In some aspects, the event comprises a change in duplex mode. In other aspects, the event comprises a timer expiring after switching to a fallback mode without instructions to remain in the fallback mode, the event triggering a return to a first mode from the fallback mode.

At block 1104, the user equipment (UE) switches, in accordance with the configuration, between the full frequency bandwidth slot and the partial frequency bandwidth slot. For example, the UE (e.g., using the controller/processor 280, memory 282, and/or the like) may receive the configuration.

Figure 12:
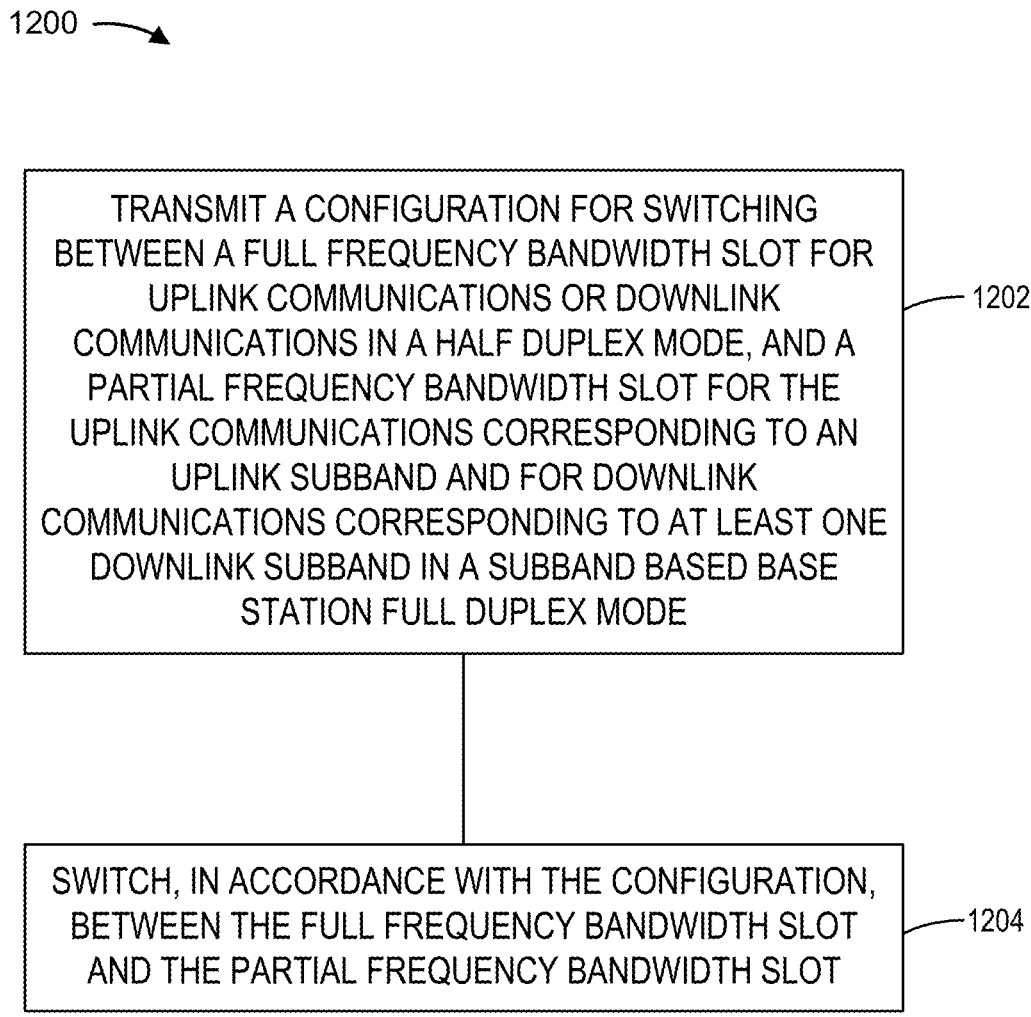
FIG. 12 is a flow diagram illustrating an example process performed, for example, by a network device, in accordance with various aspects of the present disclosure.

FIG. 12 is a flow diagram illustrating an example process 1200 performed, for example, by a network device, in accordance with various aspects of the present disclosure. The example process 1200 is an example of switching between a half-duplex (HD) bandwidth slot and a full duplex (FD) bandwidth slot during communications. The operations of the process 1200 may be implemented by a base station 110.

At block 1202, the base station transmits a configuration for switching between a full frequency bandwidth slot for uplink communications or downlink communications in a half duplex mode, and a partial frequency bandwidth slot in a subband based base station full duplex mode. The partial frequency bandwidth slot may be for the uplink communications corresponding to an uplink subband and for downlink communications corresponding to at least one downlink subband. For example, the base station (e.g., using the antenna 234, MOD/DEMOD 232, TX MIMO processor 230, transmit processor 220, controller/processor 240, memory 242, and/or the like) may transmit the configuration. In some aspects, the configuration is a group common downlink control information (DCI) message, which may carry the configuration for a group of UEs. In other aspects, the configuration is a UE dedicated downlink control information (DCI) message that carries the configuration for an individual UE. The partial bandwidth slot for downlink communications may comprise non-contiguous frequency subbands or a single contiguous frequency subband. The full frequency bandwidth slot for the uplink communications or the downlink communications in the half duplex mode may correspond to signaling for at least one of: a synchronization signal block (SSB), a system information block (SIB), a paging message, or a physical random access channel (PRACH). The configuration may comprise a pre-determined bandwidth or subband switching pattern that does not change a bandwidth part (BWP) configured for the uplink communications and/or the downlink communications. In some aspects, the configuration comprises explicit signaling dedicated to the UE or to a group of UEs. The explicit signaling may be for semi-static switching between the full frequency bandwidth slot and the partial frequency bandwidth slot. In other aspects, the explicit signaling is radio resource control (RRC) signaling, a media access control-control element (MAC-CE) or downlink control information (DCI) signaling. In still other aspects, the explicit signaling is for per-switch dynamic switching between the full frequency bandwidth slot and the partial frequency bandwidth slot. The configuration may be implicit signaling triggered by an event. In some aspects, the event comprises a change in duplex mode. In other aspects, the event comprises a timer expiring after switching to a fallback mode without instructions to remain in the fallback mode, the event triggering a return to a first mode from the fallback mode.

At block 1204, the user equipment (UE) switches, in accordance with the configuration, between the full frequency bandwidth slot and the partial frequency bandwidth slot. For example, the UE (e.g., using the controller/processor 280, memory 282, and/or the like) may receive the configuration.

Example Aspects

Aspect 1: A method of wireless communication by a user equipment (UE), comprising: receiving a configuration for switching between a full frequency bandwidth slot for uplink communications or downlink communications in a half duplex mode, and a partial frequency bandwidth slot for the uplink communications corresponding to an uplink subband or for downlink communications corresponding to at least one downlink subband in a subband based base station full duplex mode; and switching, in accordance with the configuration, between the full frequency bandwidth slot and the partial frequency bandwidth slot.

Aspect 2: The method of Aspect 1, in which the configuration comprises a group common downlink control information (DCI) message.

Aspect 3: The method of Aspect 1 or 2, in which the DCI message carries the configuration for a group of UEs.

Aspect 4: The method of Aspect 1, in which the configuration comprises a UE dedicated downlink control information (DCI) message.

Aspect 5: The method of Aspect 1 or 4, in which the DCI message carries the configuration for an individual UE.

Aspect 6: The method of any of the preceding Aspects, in which the partial bandwidth slot for downlink communications comprises non-contiguous frequency subbands.

Aspect 7: The method of any of the Aspects 1-5, in which the partial bandwidth slot for downlink communications comprises a single contiguous frequency subband.

Aspect 8: The method of any of the preceding Aspects, in which the full frequency bandwidth slot for the uplink communications or the downlink communications in the half duplex mode corresponds to signaling for at least one of: a synchronization signal block (SSB), a system information block (SIB), a paging message, or a physical random access channel (PRACH).

Aspect 9: The method of any of the preceding Aspects, in which the configuration comprises a pre-determined bandwidth or subband switching pattern.

Aspect 10: The method of any of the preceding Aspects, in which the bandwidth or subband switching pattern does not change a bandwidth part (BWP) configured for the uplink communications and/or the downlink communications.

Aspect 11: The method of any of the preceding Aspects, in which the configuration comprises explicit signaling.

Aspect 12: The method of any of the preceding Aspects, in which the explicit signaling is dedicated to the UE.

Aspect 13: The method of an of the Aspects 1-11, in which the explicit signaling is dedicated to a group of UEs.

Aspect 14: The method of any of the preceding Aspects, in which the explicit signaling is for semi-static switching between the full frequency bandwidth slot and the partial frequency bandwidth slot.

Aspect 15: The method of any of the preceding Aspects, in which the explicit signaling is radio resource control (RRC) signaling, a media access control-control element (MAC-CE) or downlink control information (DCI) signaling.

Aspect 16: The method of any of the Aspects 1-13 and 15, in which the explicit signaling is for per-switch dynamic switching between the full frequency bandwidth slot and the partial frequency bandwidth slot.

Aspect 17: The method of any of Aspects 1-10, in which the configuration comprises implicit signaling.

Aspect 18: The method of any of Aspects 1-10 or 17, in which the implicit signaling is triggered by an event.

Aspect 19: The method of any of Aspects 1-10, 17 or 18, in which the event comprises a change in duplex mode.

Aspect 20: The method of any of of Aspects 1-10 or 17-19, in which the event comprises a timer expiring after switching to a fallback mode without instructions to remain in the fallback mode, the event triggering a return to a first mode from the fallback mode.

Aspect 21: The method of any of the preceding Aspects, in which: the configuration for the partial frequency bandwidth slot includes: a first parameter set specifying a first guard band size, a first uplink bandwidth size, and a first downlink bandwidth size; or a second parameter set specifying a second guard band size, a second uplink bandwidth size, and a second downlink bandwidth size, the first parameter set differing from the second parameter set.

Aspect 22: The method of any of the preceding Aspects, in which a first pre-configured bandwidth pattern including a first uplink bandwidth, first guard band, and/or a first downlink bandwidth in the first parameter set is different than a second pre-configured bandwidth pattern including a second uplink bandwidth, a second guard band, and/or a second downlink bandwidth in the second parameter set.

Aspect 23: A method of wireless communication by a network device, comprising: transmitting a configuration for switching between a full frequency bandwidth slot for uplink communications or downlink communications in a half duplex mode, and a partial frequency bandwidth slot for the uplink communications corresponding to an uplink subband and for downlink communications corresponding to at least one downlink subband in a subband based base station full duplex mode; and switching, in accordance with the configuration, between the full frequency bandwidth slot and the partial frequency bandwidth slot.

Aspect 24: The method of Aspect 23, in which the configuration comprises a group common downlink control information (DCI) message.

Aspect 25: The method of Aspect 23 or 24, in which the partial frequency bandwidth slot for downlink communications comprises non-contiguous frequency subbands.

Aspect 26: The method of Aspect 23 or 24, in which the partial frequency bandwidth slot for downlink communications comprises a single contiguous frequency subband.

Aspect 27: The method of any of the Aspects 23-26, in which the configuration comprises a pre-determined bandwidth or subband switching pattern.

Aspect 28: The method of any of the Aspects 23-27, in which the bandwidth or subband switching pattern does not change a bandwidth part (BWP) configured for the uplink communications and/or the downlink communications.

Aspect 29: The method of any of the Aspects 23-28, in which the configuration comprises explicit signaling.

Aspect 30: The method of any of the Aspects 23-28, in which the configuration comprises implicit signaling.

Aspect 31: The method of any of the Aspects 23 or 25-30, in which the DCI message carries the configuration for an individual UE.

Aspect 32: The method of any of the Aspects 23-31, in which the full frequency bandwidth slot for the uplink communications and the downlink communications in the half-duplex mode corresponds to signaling for at least one of: synchronization signal block (SSB), system information block (SIB), paging or physical random access channel (PRACH).

Aspect 33: The method of any of the Aspects 23-32, in which the explicit signaling is dedicated to a user equipment (UE).

Aspect 34: The method of any of the Aspects 23-32, in which the explicit signaling is dedicated to a group of user equipment (UEs).

Aspect 35: The method of any of the Aspects 23-34, in which the explicit signaling is for semi-static switching between the full frequency bandwidth slot and the partial frequency bandwidth slot.

Aspect 36: The methods of any of the Aspects 23-28, 30, 31, or 32, in which the implicit signaling is triggered by an event.

Aspect 37: The method of any of the Aspects 23-36, in which: the configuration for the partial frequency bandwidth slot includes: a first parameter set specifying a first guard band size, a first uplink bandwidth size, and a first downlink bandwidth size; or a second parameter set specifying a second guard band size, a second uplink bandwidth size, and a second downlink bandwidth size; and the first parameter set differs from the second parameter set.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
   receiving a configuration for switching between a full frequency bandwidth slot for uplink communications or downlink communications in a half duplex mode, and a partial frequency bandwidth slot for the uplink communications corresponding to an uplink subband or for downlink communications corresponding to at least one downlink subband in a subband based base station full duplex mode;
   switching, in accordance with the configuration, between the full frequency bandwidth slot and the partial frequency bandwidth slot;
   receiving non-critical messages in the partial frequency bandwidth slot; and
   receiving control messages comprising a synchronization signal block (SSB) in the full frequency bandwidth slot.

2. The method of claim 1, in which the configuration comprises a group common downlink control information (DCI) message.

3. The method of claim 2, in which the DCI message carries the configuration for a group of UEs.

4. The method of claim 1, in which the configuration comprises a UE dedicated downlink control information (DCI) message.

5. The method of claim 4, in which the DCI message carries the configuration for an individual UE.

6. The method of claim 1, in which the partial bandwidth slot for downlink communications comprises non-contiguous frequency subbands.

7. The method of claim 1, in which the partial bandwidth slot for downlink communications comprises a single contiguous frequency subband.

8. The method of claim 1, in which the full frequency bandwidth slot for the uplink communications or the downlink communications in the half duplex mode corresponds to signaling for at least one of: a system information block (SIB), a paging message, or a physical random access channel (PRACH).

9. The method of claim 1, in which the configuration comprises a pre-determined bandwidth or subband switching pattern.

10. The method of claim 9, in which the pre-determined bandwidth or subband switching pattern does not change a bandwidth part (BWP) configured for the uplink communications and/or the downlink communications.

11. The method of claim 9, in which the configuration comprises explicit signaling.

12. The method of claim 11, in which the explicit signaling is dedicated to the UE.

13. The method of claim 11, in which the explicit signaling is dedicated to a group of UEs.

14. The method of claim 11, in which the explicit signaling is for semi-static switching between the full frequency bandwidth slot and the partial frequency bandwidth slot.

15. The method of claim 11, in which the explicit signaling is radio resource control (RRC) signaling, a media access control-control element (MAC-CE) or downlink control information (DCI) signaling.

16. The method of claim 11, in which the explicit signaling is for per-switch dynamic switching between the full frequency bandwidth slot and the partial frequency bandwidth slot.

17. The method of claim 9, in which the configuration comprises implicit signaling.

18. The method of claim 17, in which the implicit signaling is triggered by an event.

19. The method of claim 18, in which the event comprises a change in duplex mode.

20. The method of claim 18, in which the event comprises a timer expiring after switching to a fallback mode without instructions to remain in the fallback mode, the event triggering a return to a first mode from the fallback mode.

21. The method of claim 9, in which:
   the configuration for the partial frequency bandwidth slot includes:
      a first parameter set specifying a first guard band size, a first uplink bandwidth size, and a first downlink bandwidth size; or
      a second parameter set specifying a second guard band size, a second uplink bandwidth size, and a second downlink bandwidth size, the first parameter set differing from the second parameter set.

22. The method of claim 21, in which a first pre-configured bandwidth pattern including a first uplink bandwidth, first guard band, and/or a first downlink bandwidth in the first parameter set is different than a second pre-configured bandwidth pattern including a second uplink bandwidth, a second guard band, and/or a second downlink bandwidth in the second parameter set.

23. A method of wireless communication by a network device, comprising:
   detecting self-interference;
   transmitting, in response to detecting the self-interference, a configuration for switching to a full frequency bandwidth slot for uplink communications or downlink communications in a half duplex mode, from a partial frequency bandwidth slot for the uplink communications corresponding to an uplink subband and for downlink communications corresponding to at least one downlink subband in a subband based base station full duplex mode; and
   switching, in accordance with the configuration, between the full frequency bandwidth slot and the partial frequency bandwidth slot.

24. The method of claim 23, in which the configuration comprises a group common downlink control information (DCI) message.

25. The method of claim 23, in which the partial frequency bandwidth slot for downlink communications comprises non-contiguous frequency subbands.

26. The method of claim 23, in which the partial frequency bandwidth slot for downlink communications comprises a single contiguous frequency subband.

27. The method of claim 23, in which the configuration comprises a pre-determined bandwidth or subband switching pattern.

28. The method of claim 27, in which the pre-determined bandwidth or subband switching pattern does not change a bandwidth part (BWP) configured for the uplink communications and/or the downlink communications.

29. The method of claim 23, in which the configuration comprises explicit signaling.

30. The method of claim 23, in which the configuration comprises implicit signaling.

* * * * *